July 11, 1944. C. J. HUGHEY 2,353,241
FILM HOLDER FOR PHOTOGRAPHIC ENLARGERS
Filed Sept. 26, 1942
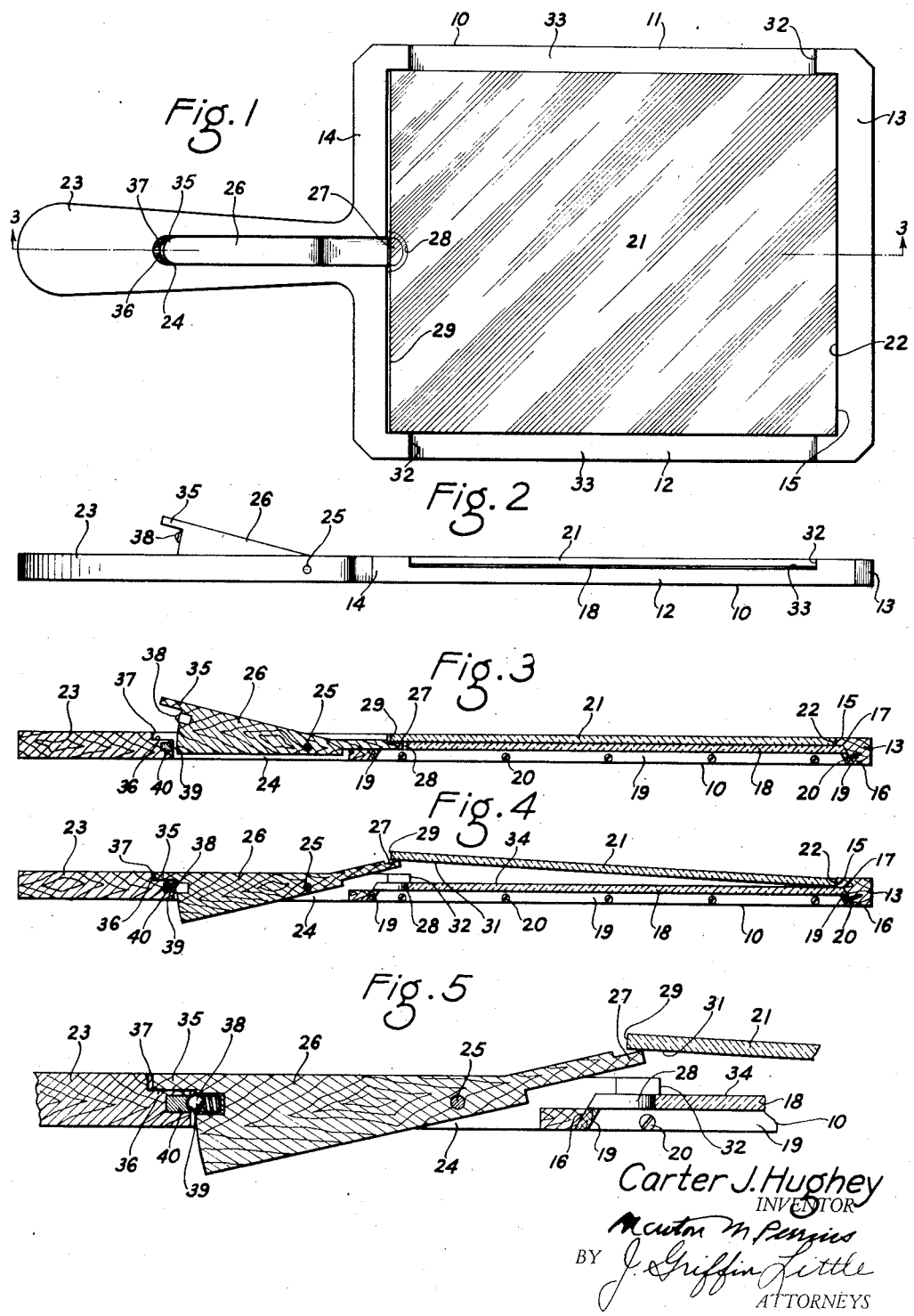
Carter J. Hughey
INVENTOR Patented July 11, 1944

2,353,241

UNITED STATES PATENT OFFICE 2,353,241

FILM HOLDER FOR PHOTOGRAPHIC ENLARGERS

Carter J. Hughey, Rochester, N. Y., assignor to Eastman Kodak Company, Rochester, N. Y., a corporation of New Jersey Application September 26, 1942, Serial No. 459,788

3 Claims. (Cl. 88—24)

The present invention relates to holders, and more particularly for film holders for use in photographic enlargers.

One object of the invention is the provision in such a holder of means for readily and easily separating the film holding or clamping members to permit the insertion or positioning of a film or negative therebetween.

Another object of the invention is the provision of a separating means for the film clamping members which is simple in construction, inexpensive to manufacture, easy to operate, and highly effective in use.

To these and other ends, the invention resides in certain improvements and combinations of parts, all as will be hereinafter more fully described, the novel features being pointed out in the claims at the end of the specification.

In the drawing:

Fig. 1 is a plan view of a film holder constructed in accordance with the present invention;

Fig. 2 is a side elevation view of the holder illustrated in Fig. 1;

Fig. 3 is a sectional view through the holder illustrated in Fig. 1 and taken substantially on line 3—3 thereof, and showing the relation of the holder parts when in the film clamping position;

Fig. 4 is a view similar to Fig. 3, but showing the relation of the holder parts when the film clamping members are separated to permit the placing or positioning of the film or negative in the holders; and Fig. 5 is a view of a portion of the holder illustrated in Fig. 4 but on a larger scale than the latter to more clearly show the holding means for the operating lever.

Similar reference numerals throughout the various views indicate the same parts.

The drawing shows a film holder formed from any suitable material to provide a hollow rectangular frame or member 10 having opposite side walls 11 and 12 and opposite end walls 13 and 14, and a central aperture 15 for framing the film or negative positioned in the holder. The under side of the walls 11, 13, and 14, are rabbeted out, as shown at 16, to provide a shoulder or ledge 17 against which a lower glass film holding plate 18 may be fixedly held and retained by strips 19 secured to the wall members by screws 20, or other suitable fastening means. This lower plate 18 extends over the full area of the aperture 15, and serves to support the film, not shown, and an upper glass plate 21 with which it cooperates, when in position shown in Fig. 3, to tightly clamp a film or negative therebetween. The upper plate 21 also covers the aperture 15, and merely rests loosely on the lower plate 18 and is adapted to be moved relatively thereto about an edge 22 to separate the plates, as shown in Fig. 4, to permit the insertion or positioning of the film between the plates. The edge 22 thus forms, in effect, a hinge connection between the two plates 18 and 21. The plate 21 is held in place by the walls 11, 12, 13, and 14, as shown in Figs. 3 and 4.

The end wall 14 of the frame 10 has formed thereon a handle 23 by which the frame may be manipulated. This handle has formed therein a longitudinally extending slot 24 in which is pivotally mounted at 25 an operating lever 26 of the shape best shown in Figs. 3, 4, and 5. The lever 26 is formed with a projecting portion or tongue 27 which extends into the aperture 15 and into a small cut-out portion or aperture 28 formed in the lower glass plate 18 so that when the lever 26 is in its inoperative position, as shown in Fig. 3, the portion 27 will lie in a plane of the lower plate 18, as clearly shown in Fig. 3. The portion 27 is positioned under the upper plate 21 adjacent the edge 29 which is opposite the hinge edge 22.

It will now be apparent that when the lever 26 is pivoted or moved in a counter-clockwise direction about its point 25 from the position shown in Fig. 3 to the position shown in Fig. 4, the position 27 will move upwardly and engage the under surface 31 of the upper plate 21 adjacent the edge 29 thereof to move the plate 21 upwardly about its hinge edge 22 to separate the plates 18 and 21, as shown in Fig. 4. When the plates are in this separated position, a film or negative may be inserted in proper position between the plates. To facilitate the ready insertion of the film between the plates, the upper edge of the sides 11 and 12 of the frame 10 are cut away to provide aligned slots or recesses 32, the bottoms 33 of which are arranged substantially in alignment with the upper surface 34 of the lower plate 18, the advantages of which will be readily apparent.

When the lever 26 has thus been moved to the position shown in Fig. 4, a stop portion 35 thereon engages the bottom 36 of a recess 37 formed in the handle 23 at the end of the slot 24 to arrest or limit further counter-clockwise movement of the lever 26 and, hence, the upward movement of the upper plate 21. Substantially simultaneously with the engagement of the stop portion 35 with the bottom 36, a spring-pressed ball 38 carried by the lever 26 engages a recess 39 formed in a plate 40 secured to the handle 23 at the end of slot 24 to releasably hold the lever in a plate elevating position, as shown in Figs. 4 and 5. As the lever 26 is now held, both hands of the operator are free to insert and position the film in the holder or to remove a film therefrom.

After the film has been positioned, the lever 26 is moved in a counter-clockwise direction about its pivot 25 to first release the ball 28 from the recess 29. The lever 26 and upper plate 21 are then free and may be moved to the position shown in Fig. 3 to lower the plate 21 so that the latter may cooperate with the lower or bottom plate 18 to clamp the film. When this position is reached, the portion 27 of the lever 26 engages the end wall 14 to limit further clockwise movement of the lever. The wall 14 and the bottom 36 of the recess 37 thus serves to provide stop or limiting means for movement of the lever 26 in opposite directions of its movement. As the handle 23 is integral with the frame 10, these stop members may be broadly considered as being on the frame 10.

The present invention thus provides a simple, effective, and easily operable means for separating the film clamping plate to permit the insertion or removal of a film. When the clamping plates are in open or separated position, they are so held by a releasable catch which may be readily disengaged to permit the closing of the clamping plate.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. A film holder for photographic enlargers comprising, in combination, a flat frame formed with a central aperture, a pair of film clamping members carried by said frame and extending across said aperture and hingedly connected along one edge of said aperture, aligned recesses found on opposite edges of said frame adjacent said one edge to facilitate the insertion of a film strip between said members, a handle formed at another edge of said frame opposite said one edge, a lever pivoted on said handle, a portion of said lever positioned under one of said members and adjacent said other edge and arranged to engage and move said one member to separate said members to facilitate the positioning of a film therebetween when said lever is moved in one direction, the movement of the lever in the opposite direction serving to move said portion to allow said one member to move toward the other member and to cooperate therewith to clamp the film therebetween, and cooperating means on said handle and said lever to hold the latter when it has been moved in said one direction to retain the members in separated position.

2. A film holder for photographic enlargers comprising, in combination, a hollow rectangular frame member formed to provide a central aperture, a pair of glass plates carried by said frame and extending across said aperture, means for fixedly mounting one of said plates to said frame, the other of said plates being movable on the one plate about an edge thereof to permit said plates to be separated for the insertion and positioning of a film therebetween, the opposite sides of said frame adjacent said one edge being formed with recesses to facilitate the movement of said film to and from a position between said plates, a handle formed on said frame on an edge opposite said one edge, a lever pivotally mounted on said handle, a portion of said lever projecting into said aperture and positioned below said other plate opposite said one edge so that the pivotal movement of said lever in one direction will move said portion to lift the other plate about said one edge to separate said plates, and the pivotal movement of the lever in the opposite direction will move said portion so that said other plate will move toward and cooperate with said one plate to clamp the film, and spring pressed means carried by said lever and arranged to engage a cooperating part of said handle when said lever is moved in said one direction to hold the plates in separated relation.

3. A film holder for photographic enlargers comprising in combination, a flat frame formed with a central aperture, a lower glass plate fixedly mounted in said aperture, an upper glass plate arranged in said aperture and loosely positioned on and supported by said lower plate and adapted to cooperate with the latter to clamp a film, aligned recesses formed in the opposite edges of said frame between said plates, a handle projecting from another edge of said frame, a member pivoted on said handle, a portion of said member extending under one edge of said upper plate adjacent said other edge, said portion being movable in one direction to lift said one edge to tip said upper plate on said lower plate to separate said plates to permit the insertion of said film therebetween, said portion being movable in the opposite direction to lower said upper plate toward said lower plate to clamp said film, cooperating means on said handle and member to releasably retain said portion in plate separating position, and parts on said handle and member for limiting the movement of said member.

CARTER J. HUGHEY.